No. 730,505.

Patented June 9, 1903.

UNITED STATES PATENT OFFICE.

CUSHING ADAMS, OF BELLOWS FALLS, VERMONT.

CALCIMINE COMPOSITION AND PROCESS OF PRODUCING SAME.

SPECIFICATION forming part of Letters Patent No. 730,505, dated June 9, 1903.

Application filed December 15, 1902. Serial No. 135,216. (No specimens.)

*To all whom it may concern:*

Be it known that I, CUSHING ADAMS, a citizen of the United States, residing at Bellows Falls, in the county of Windham and State of Vermont, have invented or discovered certain new and useful Improvements in Calcimine Compositions and Processes for Producing Same, of which the following is a specification.

This invention or discovery has for its object to provide a calcimine or wall-coating which may be properly mixed up, and which when mixed will be of such a character that the mineral base thereof will not have a tendency to settle or separate from the water of the mixture, the calcimine or wall-coating being of such a character that it will adhere strongly to the walls or surfaces to which it may be applied, so that it will not be liable to be rubbed off.

My improved calcimine comprises a mineral base—as talc, whiting, gypsum, or kaolin—preferably consisting of kaolin and gypsum in about equal proportions; or it may consist entirely of any one of the materials above mentioned, and combined with this mineral base is an adhesive consisting of casein which has been previously treated with an alkaline substance, as borax, or with an alkali, as carbonate of soda or soda-ash, but preferably soda-ash; and I add alum or its chemical equivalent to the mineral base and adhesive for the purpose of giving a jelly-like body to the calcimine mixture when a suitable quantity of water has been added to the dry components thereof.

In carrying my invention or discovery into effect I take about seven parts of an alkaline substance, as borax, or of an alkali, as carbonate of soda or soda-ash, preferably soda-ash, and dissolve the same in cold water and add this alkaline solution to about ninety-three parts of crude dry casein, which will so readily absorb the alkaline mixture as to still remain in a practically dry condition. This mixture of alkali and casein is next ground to a powder, and about fifteen parts of dry powdered alkali, as carbonate of soda or soda-ash, or about fifteen parts of a powdered alkaline substance, as borax, but preferably powdered borax, is then added to the casein and alkaline mixture after they have been ground together. I then take about seven parts of this casein and alkaline mixture with the additional alkali or borax mentioned, and which mixture is in a dry condition, and mix the same with a mineral base consisting, preferably, of about forty-six parts of dry powdered kaolin and forty-six parts of dry powdered gypsum; or the mineral base may be wholly either of kaolin or gypsum alone; and to this mixture I add about one part of dry powdered alum or its chemical equivalent, as salts of aluminium or aluminium hydroxid. These powdered ingredients are then thoroughly mixed together to form the calcimine composition, which is now in condition to be put upon the market in a dry powdered form.

In preparing the calcimine for use about one hundred and twenty parts cold water, by weight, are added to the calcimine powder preparation, and the whole is then thoroughly stirred up together. The addition of the alum or aluminium salt to the casein and mineral base composition gives a jelly-like body to the mixture, so that the mineral base does not separate or settle in the liquid mixture, but is held in suspension mechanically in the somewhat thick and viscous liquid, without, however, deteriorating from the capacity of the same to be easily and thinly spread upon the surface to be coated or calcimined.

I do not wish to be understood as limiting my invention or discovery to the exact proportions of the ingredients hereinbefore stated, as these may be varied somewhat without essentially changing the results aimed at.

Having thus described my invention or discovery, I claim and desire to secure by Letters Patent—

1. The herein-described calcimine composition, consisting of a mineral base, casein, an alkali, borax and alum, in substantially the proportions specified.

2. The herein-described calcimine composition, consisting of a mineral base, casein, soda-ash, borax and alum, in substantially the proportions specified.

3. The herein-described calcimine composition, consisting of kaolin, gypsum, casein, an alkali, borax and alum, in substantially the proportions specified.

4. The herein-described calcimine composition, consisting of kaolin, gypsum, casein, soda-ash, borax and alum, in substantially the proportions specified.

5. The herein-described process for producing a calcimine composition, the same consisting in mixing a solution of an alkali with casein, grinding the mixture to powder, adding thereto borax, and then combining about seven parts of the casein, alkali and borax mixture with about ninety-two parts of a mineral base and one part of powdered alum.

6. The herein-described process for producing a calcimine composition, the same consisting in mixing a solution of soda-ash with casein, grinding the mixture to powder, adding thereto borax, and then combining about seven parts of the casein, soda-ash and borax mixture with about ninety-two parts of a mineral base and one part of powdered alum.

In testimony whereof I affix my signature in presence of two witnesses.

CUSHING ADAMS.

Witnesses:
 C. M. SWEENEY,
 ARTHUR W. CALVER.